US012692411B2

(12) United States Patent
Brauckmann et al.

(10) Patent No.: US 12,692,411 B2
(45) Date of Patent: Jul. 28, 2026

(54) AQUEOUS, LOW SOLIDS BASECOAT COMPOSITIONS

(71) Applicant: BASF COATINGS GMBH, Münster (DE)

(72) Inventors: Florian Brauckmann, Münster (DE); Michael Richert, Münster (DE); Andreas Poppe, Münster (DE); Wolfgang Duschek, Münster (DE)

(73) Assignee: BASF COATINGS GMBH, Muenster (DE)

( * ) Notice: Subject to any disclaimer, the term of this patent is extended or adjusted under 35 U.S.C. 154(b) by 604 days.

(21) Appl. No.: 18/246,170

(22) PCT Filed: Sep. 22, 2021

(86) PCT No.: PCT/EP2021/076114
§ 371 (c)(1),
(2) Date: Mar. 21, 2023

(87) PCT Pub. No.: WO2022/063854
PCT Pub. Date: Mar. 31, 2022

(65) Prior Publication Data
US 2023/0365833 A1 Nov. 16, 2023

(30) Foreign Application Priority Data
Sep. 23, 2020 (EP) .................................... 20197707

(51) Int. Cl.
| | |
|---|---|
| *C09D 7/65* | (2018.01) |
| *B05D 1/04* | (2006.01) |
| *B05D 3/02* | (2006.01) |
| *C09D 7/20* | (2018.01) |
| *C09D 7/61* | (2018.01) |
| *C09D 133/08* | (2006.01) |
| *C09D 167/04* | (2006.01) |
| *C09D 175/04* | (2006.01) |

(52) U.S. Cl.
CPC ............. *C09D 175/04* (2013.01); *B05D 1/04* (2013.01); *B05D 3/0272* (2013.01); *C09D 7/20* (2018.01); *C09D 7/61* (2018.01); *C09D 7/65* (2018.01); *C09D 133/08* (2013.01); *C09D 167/04* (2013.01); *B05D 2201/02* (2013.01); *B05D 2502/00* (2013.01); *B05D 2503/00* (2013.01); *B05D 2508/00* (2013.01)

(58) Field of Classification Search
CPC .......... C09D 175/04; C09D 7/20; C09D 7/61; C09D 7/65; C09D 133/08; C09D 167/04; C09D 5/00; C09D 7/43; C09D 5/024;

C09D 133/06; C09D 167/00; B05D 1/04; B05D 3/0272; B05D 2201/02; B05D 2502/00; B05D 2503/00; B05D 2508/00; B05D 1/02; B05D 7/577; B05D 2201/00; B05D 2202/00; B05D 7/532
See application file for complete search history.

(56) References Cited

U.S. PATENT DOCUMENTS

| | | | |
|---|---|---|---|
| 2007/0237903 A1 | 10/2007 | Hiwara et al. | |
| 2008/0220275 A1 | 9/2008 | Noguchi et al. | |
| 2009/0238811 A1* | 9/2009 | McDaniel ................. | A61L 2/00 424/94.2 |
| 2019/0344309 A1 | 11/2019 | Ono et al. | |
| 2021/0291224 A1 | 9/2021 | Affeldt et al. | |
| 2022/0220335 A1* | 7/2022 | Reil ......................... | B05D 1/02 |

FOREIGN PATENT DOCUMENTS

| | | |
|---|---|---|
| DE | 4405148 C1 | 5/1995 |
| JP | 201687569 A | 5/2016 |
| JP | 2016222754 A | 12/2016 |
| WO | 2006082623 A1 | 8/2006 |
| WO | 2019016168 A1 | 1/2019 |
| WO | 2020232011 A1 | 11/2020 |

OTHER PUBLICATIONS

International Search Report and Written Opinion for corresponding PCT/EP2021/076114 mailed Dec. 2, 2021, 9 pages.

* cited by examiner

*Primary Examiner* — Kumar R Bhushan
(74) *Attorney, Agent, or Firm* — Armstrong Teasdale LLP

(57) ABSTRACT

Disclosed herein is an aqueous, one-pack coating composition including a polymer, a crosslinking agent, a polymeric surface-active agent, and an organic rheology control agent. The total solids content of the coating composition is from 7.5-11.5 wt.-%; the viscosity at 23° C. is from 2000-12000 mPas at a shear rate of 0.1 s-1¬; the amount of the polymeric surface-active agent is from 0.5-25 wt.-% based on the total solids content of the coating composition; the amount of the organic rheology control agent is from 5-12 wt.-% based on the total solids content of the coating composition; and the coating composition does not contain platelet-shaped particulate material having a median particle size of 2 μm or more. Further disclosed herein are methods of producing a coating and applying the coating with a device producing a coating composition jet, and substrates coated by the methods.

20 Claims, No Drawings

AQUEOUS, LOW SOLIDS BASECOAT COMPOSITIONS

CROSS-REFERENCE TO RELATED APPLICATIONS

This application is a U.S. National Phase Application of International Patent Application No. PCT/EP2021/076114, filed Sep. 22, 2021, which claims priority to European Patent Application No. 20197707.1, filed Sep. 23, 2020, each of which is hereby incorporated by reference herein.

The invention relates to an aqueous, low solids basecoat composition, which is applicable by means of a coating device producing a jet of the coating composition. The invention further relates to such method of coating a substrate making use of the basecoat composition and substrates coated by using such coating method. The coating composition and method of coating should be particularly suitable to coat substrates in the automotive field such as automotive bodies and automotive body parts.

TECHNOLOGICAL BACKGROUND

In the technological field of coating, spray application is a widespread method to coat substrates. In automotive coating the vehicle body and vehicle body components to be painted are typically transported on a conveyor at right angles to the drawing plane through a painting cabin, in which the motor vehicle body or its components are painted in a conventional manner by painting robots, the painting robots having several rotating robot arms each of which carry, via a multi axis robot hand axle, an application device, such as, for example, a rotary atomizer, an air atomizer, or a so-called airless device.

A drawback of these known application devices or application methods is the non-optimal degree of application efficiency, whereby a portion of the sprayed paint, known as overspray, does not land on the motor vehicle body component to be painted and has to be removed from the painting cabin with the cabin air.

In conventional rotary atomizers the paint is atomized due to shearing forces on the edge of the bell cup; for an air atomizer it is due to the kinetic energy of the air. The airless principle is based on atomization of the paint by the material pressure. Here the paint is pressurized and atomized at a nozzle. In this way conventional atomizers for coating motor vehicle body parts usually generate a wide distribution of different droplet sizes. These usually range from a few μm up to 150 μm. The average value (d50) usually lies between 10 to 40 μm. Smaller droplets are more easily carried out by the cabin air into the separation system. Larger droplets are detrimental to the appearance and can even lead to surface defects.

US 2013/0284833 A1 provides a coating device producing a jet of the coating composition, which is broken down into droplets before hitting the surface to be coated. This coating device allows the reduction of overspray and generates droplets having substantially the same size (for example of substantially the same diameter) and/or a substantially discrete or substantially homogeneous droplet distribution. The application apparatus disclosed in US 2013/0284833 A1 can, in particular be configured and arranged to apply an oscillation and/or an instability to the coating composition jet in order to generate coating composition droplets or to allow the coating composition jet to break up into droplets.

The above coating method in which a jet of droplets of the coating composition is created and whereby the droplet disintegration of the initially continuous coating composition jet is specifically forced by the coupling-in of vibrations so that the disintegration distance i.e., the distance between the application device and the surface to be coated, is—according to US 2015/0375258 A1—not fully satisfactory. Therefore, US 2015/0375258 A1 provides a further improved device and coating method.

Contrary to the teaching of disintegration of the coating composition jet into droplets as disclosed in US 2013/0284833 A1, specifically through the coupling-in of vibrations, US 2015/0375258 A1 teaches the use of the continuous region of the coating composition jet for coating. Thus, the application distance (i.e., the distance between, firstly, the discharge opening of the application device and, secondly, the surface to be coated) is therefore selected to be smaller than a disintegration distance of the coating composition jet, i.e., a length of a continuous region of the coating medium jet between the discharge opening of the application device and the end of the continuous region at the transition to disintegration into droplets. This has the result that the coating composition jet impacts with its continuous region onto the surface to be coated, which leads to a better coating result.

In the application method according to US 2015/0375258 A1, in accordance with US 2013/0284833 A1, first a coating composition jet is emitted from an application device wherein, after emerging from the application device, the coating composition jet initially has a continuous region in the jet direction until said jet reaches a disintegration distance, whereupon after said disintegration distance after emission from the application device, the coating medium jet then disintegrates naturally (by natural disintegration according to Rayleigh as is known) into droplets which are separate from one another in the jet direction. However, in US 2015/0375258 A1 the coating composition jet hits the surface to be coated before natural disintegration occurs.

In contrast to conventional atomizing methods by means of rotary atomizers, with both of the above application methods sharp-edged patterns can be achieved, which is important for a high-quality impression. Firstly, the concept of a sharp-edged pattern means that the edge of the pattern has very small deviations in relation to a pre-defined edge form, typically less than 0.1 mm. Secondly, the expression "sharp-edged pattern means that, outside of the coated pattern, no coating composition splashes impact on the adjacent surface. While other methods would require to mask the adjacent, i.e. not to be coated parts of the surface, this is not required for the above-described two methods. To accomplish this, the nozzles used to form the coating composition jet have small dimensions of typically less than 100 μm.

However, the inventors of the present invention noticed that the improved coating method set-up described in US 2015/0375258 A1 has the disadvantage that in many cases a streaky appearance of typical aqueous basecoat layers results.

PROBLEM

The main aim of the present invention was to provide aqueous, one-pack coating compositions, which are applicable by means of a coating device and method producing a jet of the coating composition, such as e.g. described in US 2013/0284833 or US 2015/0375258 A1, optionally the jet being disintegrated into droplets before it hits the surface to be coated, as e.g. described in US 2013/0284833, providing sharp-edged patterns and an improved appearance, particularly without showing a streaky appearance and or tracing in application direction. Moreover, other surface defects should also be avoided, such as bubbling and formation of pinholes. Further the formation of overspray should be avoided. Particularly preferred, the aqueous one-pack compositions should be suitable as basecoat compositions, particularly in automotive coating.

SUMMARY OF THE INVENTION

The problems addressed above were solved by providing an aqueous, one-pack coating composition, comprising
   (A) at least one polymer selected from the group consisting self-crosslinkable polymers and externally crosslinkable polymers;
   (B) at least one crosslinking agent for crosslinking the at least one polymer (A), if at least one of the (A) at least one polymer is an externally crosslinkable polymer;
   (C) at least one polymeric surface-active agent, and
   (D) at least one organic rheology control agent selected from the group consisting of (meth)acrylic acid-(meth) acrylate copolymer rheology control agents (D1) and polyurethane rheology control agents (D2),
   characterized in that
   i. the total solids content of the coating composition is from 7.5 wt.-% to 11.5 wt.-%,
   ii. the viscosity at 23° C. is from 2000 mPas to 12000 mPas at a shear rate of $0.1 \ s^{-1}$,
   iii. the amount of (C) is from 0.5 to 25 wt.-% based on the total solids content of the coating composition;
   iv. the amount of (D) is from 5 to 12 wt.-% based on the total solids content of the coating composition; and
   v. the coating composition does not contain platelet-shaped particulate material having a median particle size $D_{50}$ (determined by laser diffraction) of 2 μm or more.

In the following, such aqueous, one-pack coating compositions are also called "aqueous, one-pack coating compositions according to the invention" or just "coating compositions according to the invention".

The term "one-pack coating composition" as used herein refers to coating compositions, which—other than two-pack coating compositions—contain a self-crosslinkable polymer or an externally crosslinkable polymer, or both, whereby in the latter case at least one crosslinking agent is contained in the coating composition which is apt to cure the externally crosslinkable polymer, and wherein curing reactions (i.e. crosslinking) of the self-crosslinkable polymer or an externally crosslinkable polymer takes place only at elevated temperatures, preferably at temperatures above 80° C., more preferred above 100° C., most preferred at temperatures from 120 to 200° C., such as 130° C. to 180° C. One-pack coating compositions are typically storage stable at temperatures from about ambient temperature to about 80° C., such as temperatures ranging from 20 to 60° C. or 25 to 40° C., meaning that there is no remarkable premature curing reaction, i.e. no significant viscosity change due to crosslinking at a chosen temperature in the respective range.

The term "polymer" is known to the person skilled in the art and, for the purposes of the present invention, preferably encompasses polyadducts, polycondensates and polymers obtained by chain reaction of monomers having ethylenically unsaturated double bonds. The term "polymer" includes both homopolymers and copolymers.

The term "self-crosslinkable polymer" is known to one of skill in the art and refers to polymers containing at least two types of reactive groups, which are apt to crosslink with each other at the crosslinking temperature. Since both intramolecular and intermolecular reactions occur, a crosslinked polymeric network is formed.

The term "externally crosslinkable polymer" is also known to the one skilled in the art and refers to polymers containing crosslinkable groups, which, at crosslinking temperature, react with complementary groups comprised in separate species, i.e. so-called crosslinking agents. As an example, hydroxyl functional polymers react with blocked isocyanate groups of blocked polyisocyanates at a temperature above the deblocking temperature of the blocked polyisocyanates; or hydroxyl functional polymers react with etherified methylol groups of aminoplast resins at crosslinking temperature; in both cases polymeric networks being formed.

The term "polymeric surface-active agent" refers to "surface-active agents", i.e. species, when dissolved or dispersed in an aqueous medium, such as the aqueous coating composition according to the invention, accumulate at the air/coating composition interface. The term "polymeric", in this context is to distinguish the surface-active agents from those in monomeric form, as e.g. sodium dodecyl sulfate, and is used in accordance with the above definition of the term "polymer".

The term "rheology control agent" has the same meaning as "rheological additive" as commonly used by the skilled person in the art and as defined in Römpp Lexikon "Lacke und Druckfarben" (Thieme, 1998, Stuttgart, page 497). According to this encyclopedia on coatings and paints, rheological properties, such as the consistency of coating compositions are primarily adjusted by the choice of binders, solvents and the pigment-to-filler ratio. However, to secondarily adjust the consistency, viscosity and flowing behavior during production, application and film-formation, so-called rheological additives are used. "Organic rheology control agents" are—in contrast to inorganic rheology control agents, such as some layer silicates, of organic nature.

The total solids content of the coating material being determined as described in the following paragraph, the density of the coating material being calculated from the densities of its ingredients and the density of the cured coating composition being determined by DIN EN ISO 3233 "dry film density".

The total solids content—also referred to as "solids content"—of the aqueous, one-pack coating composition is the same as the nonvolatile content. The total solids content as understood in the present invention is determined according to DIN ISO 3251 by exposing 1 g of the coating composition to a temperature of 130° C. for 60 min and weighing the remainder. The remainder in g divided by 1 g and multiplied by 100 gives the total solids content of the coating composition in percent by weight. This method can also be applied for any pre-dissolved or pre-dispersed ingredients employed in the coating composition.

The difference between the total solids content and 100 wt.-% is the amount of volatile ingredients. Since the amount of water, which is present in the coating composition of the present invention is known from the formulation, the amount of water in weight percent, contained in the volatile ingredients of the coating composition, can easily be calculated by dividing the amount of water (in g) present in 1 g of the coating composition by the amount of volatile ingredients contained in 1 g of the coating composition and multiplying the result by 100. Since the one-pack coating compositions of the invention are "aqueous", they comprise water as main part of the volatile ingredients. The coating compositions of the present invention preferably contain at least 60 wt.-%, more preferred at least 70 wt.-% and most preferred at least 80 wt.-% of water based on the amount of volatile ingredients in the coating composition. The difference between the content of water in percent by weight and the total volatile content in percent by weight is the volatile organic content in percent by weight.

The viscosity of the coating composition according to the invention is determined at 23° C. using a rotational viscosimeter (Anton Paar Rheolab QC) at a shear rate of 0.1 s⁻¹.

The term "platelet-shaped particulate material" refers—according to DIN 66160:1992-09, paragraph 2.2.19—to particles which are, in one special direction, much less thick as in the others. This definition is also found in in Römpp Lexikon "Lacke und Druckfarben" (Thieme, 1998, Stuttgart, page 434, keyword "Partikelform"/"particle shape").

The median particle size—stated as the $D_{50}$ (i.e., 50 percent by volume of the particles have a size below the stated average particle size) of the particulate material, typically being a pigment or filler powder, is measured by laser diffraction according to ISO 13320-1:1999). More details of the measurement are found in the experimental section.

Another object of the present invention is a method of producing the aqueous, one-pack coating composition according to the invention by mixing its ingredients.

Further object of the present invention is a method for producing a coating, the method at least comprising the following steps:

a. emitting a jet of the aqueous, one-pack coating composition according to the invention from an application device, wherein, after emerging from the application device, the coating composition jet has a continuous region in the jet direction until said jet reaches a disintegration distance, whereupon, after the disintegration distance, the coating composition jet then disintegrates into droplets that are separate from one another in the jet direction; and b. positioning the application device at a specified application distance from the substrate which is to be coated so that the coating composition jet impacts on the substrate and coats the substrate to obtain a coating layer; wherein c. the application distance is smaller than the disintegration distance of the coating composition jet, so that the coating composition jet impacts on the substrate with its continuous region; or alternatively, and less preferred, wherein the application distance is larger than the disintegration distance of the coating composition jet, so that the separate droplets formed impact on the substrate.

In the following this method is denoted as "method for producing a coating according to the invention". This method can be configured as a method to produce a single-layer coating. Or it can be part of a method to produce a multi-layer coating, both being also subsumed under the term "method for producing a coating according to the invention".

Yet another object of the present invention is a coated substrate obtainable by the method according to the invention.

DETAILED DESCRIPTION

Aqueous, One-Pack Coating Composition
Component (A)

The aqueous, one-pack coating composition of the invention contains (A) at least one polymer as component (A).

This polymer is used as a binder. For the purposes of the present invention, the term "binder" is understood in accordance with DIN EN ISO 4618 (German version, date: March 2007) to be the non-volatile fraction of a coating composition which is responsible for the film formation. Pigments contained therein and/or fillers are thus not subsumed under the term of the binder.

Preferably, the (A) at least one polymer (A) is the main binder of the coating composition. As the main binder in the present invention, a binder component is preferably referred to which is contained in an amount of at least 50 wt.-%, more preferred at least 60 wt.-% and most preferred at least 70 wt.-% based on the total solids content of the respective coating composition.

Suitable polymers which can be used as component (A) are, for example, disclosed in EP 0 228 003 A1, DE 44 38 504 A1, EP 0 593 454 B1, DE 199 48 004 A1, EP 0 787 159 B1, DE 40 09 858 A1, DE 44 37 535 A1, WO 92/15405 A1 and WO 2005/021168 A1.

Preferably, the (A) at least one polymer used as component (A) is selected from the group consisting of polyurethanes, polyureas, polyesters, polyamides, polyethers, poly(meth)acrylates and/or copolymers of said polymers, such as polyurethane poly(meth)acrylates and/or polyurethane polyureas.

The at least one polymer used as component (A) is most preferably selected from the group consisting of polyurethanes, polyesters, poly(meth)acrylates and/or copolymers of said polymers, all of which are preferably at least hydroxy functional. The term "(meth)acryl" or "(meth)acrylate" in the context of the present invention includes in each case the meanings "methacrylic" and/or "acrylic" or "methacrylate" and/or "acrylate".

Preferred polyurethanes are described, for example, in German patent application DE 199 48 004 A1, page 4, line 19 to page 11, line 29 (polyurethane prepolymer B1), in European patent application EP 0 228 003 A1, page 3, line 24 to page 5, line 40, European Patent Application EP 0 634 431 A1, page 3, line 38 to page 8, line 9; and international patent application WO 92/15405, page 2, line 35 to page 10, line 32 or denoted as VD1 and WO 2018/011311 (Example PD1).

Preferred polyesters are described, for example, in DE 4009858 A1 in column 6, line 53 to column 7, line 61 and column 10, line 24 to column 13, line 3 or WO 2014/033135 A2, page 2, line 24 to page 7, line 10 and page 28, line 13 to page 29, line 13 described.

Other suitable polyesters are polyesters having a dendritic structure, as described, for example, in WO 2008/148555 A1.

Preferred polyurethane-poly(meth)acrylate copolymers ((meth)acrylated polyurethanes) and their preparation are described, for example, in WO 91/15528 A1, page 3, line 21 to page 20, line 33 and in DE 4437535 A1, page 2, line 27 to page 6, line 22.

Preferred poly(meth)acrylates are those which can be prepared by multistage free-radical emulsion polymerization of ethylenically unsaturated monomers in water and/or organic solvents. Furthermore, so-called seed-core-shell polymers (SCS polymers) can be used. Such polymers or aqueous dispersions containing such polymers are known, for example, from WO 2016/116299 A1.

Preferred polyurethane-polyurea copolymers are polyurethane-polyurea particles, preferably those having an average particle size of 40 nm to less than 2000 nm.

The polymer used as component (A) is preferably externally crosslinking and has reactive functional groups which enable a crosslinking reaction. Any common crosslinkable reactive functional group known to those skilled in the art is contemplated.

Preferably, the polymer used as component (A) has at least one kind of functional reactive groups selected from the group consisting of primary amino groups, secondary amino groups, hydroxyl groups, thiol groups, carboxyl groups and carbamate groups. Preferably, the polymer used as component (A) contains at least functional hydroxyl groups.

Preferably, the polymer used as component (A) is hydroxy-functional and more preferably has an OH number in the range of 5 to 250 mg KOH/g, more preferably from 20 to 120 mg KOH/g.

The polymer used as component (A) is particularly preferred at least one of a hydroxy-functional polyurethane-poly(meth)acrylate copolymer, a hydroxy-functional polyester and/or a hydroxy-functional polyurethane copolymer.

Component (B)

In addition, the aqueous, one-pack coating composition of the present invention may contain at least one crosslinking agent known to the one skilled in the art. Crosslinking agents are to be included among the film-forming non-volatile components of a coating composition, and therefore fall within the general definition of the binder.

While the at least one crosslinking agent is necessary, if the at least one polymer of component (A) is only externally crosslinkable, it is also possible that some crosslinking agents, particularly aminoplast resins as those described below, rather act as flexibilizers, particularly at temperatures below their curing temperature. Thus, in any case, but even in cases where no crosslinker is needed for crosslinking the at least one polymer of component (A), it is still possible to employ component (B), particularly an aminoplast resin as described below to flexibilize the coating.

If a crosslinking agent is present, it is preferably at least one aminoplast resin and/or at least one blocked polyisocyanate, preferably an aminoplast resin. Among the aminoplast resins, melamine resins such as melamine-formaldehyde resins are particularly preferred. The term "polyisocyanate" as used herein encompasses polyisocyanates with two or more isocyanate groups on average. Since the coating compositions according to the invention are one-pack coating compositions the "blocked polyisocyanates" as used herein are fully blocked, i.e. do not contain free isocyanate groups.

Suitable polyisocyanates to produce blocked polyisocyanates include in principle all known aliphatic, cycloaliphatic, aliphatic-cycloaliphatic, aromatic, aliphatic-aromatic and/or cycloaliphatic-aromatic polyisocyanates and polyisocyanate adducts that are used in the aqueous coating materials in fully blocked form. It is also possible to use polyisocyanates containing isocyanurate, biuret, allophanate, iminooxadiazinedione, urethane, urea carbodiimide and/or uretdione groups.

Examples of suitable polyisocyanates are isophorone diisocyanate (=5-isocyanato-1-isocyanatomethyl-1,3,3-trimethylcyclohexane), 5-isocyanato-1-(2-isocyanatoeth-1-yl)-1,3,3-trimethylcyclohexane, 5-isocyanato-1-(3-isocyanatoprop-1-yl)-1,3,3-trimethylcyclohexane, 5-isocyanato-(4- isocyanatobut-1-yl)-1,3,3-trimethylcyclohexane, 1-isocyanato-2-(3-isocyanatoprop-1-yl)-cyclohexane, 1-isocyanato-2-(3-isocyanato-eth-1-yl) cyclohexane, 1-isocyanato-2-(4-isocyanatobut-1-yl) cyclohexane, 1,2-diiso-cyanato cyclobutane, 1,3-diisocyanatocyclobutane, 1,2-diisocyanatocyclopentane, 1,3-diisocyanatocyclopentane, 1,2-diisocyanatocyclohexane, 1,3-diisocyanatocyclo-hexane, 1,4-diisocyanatocyclohexane, dicyclohexylmethane 2,4'-diisocyanate, dicyclohexylmethane 4,4'-diisocyanate, liquid dicyclohexylmethane 4,4'-diisocyanate with a trans/trans content of up to 30% by weight; trimethylene diisocyanate, tetramethylene diisocyanate, pentamethylene diisocyanate, hexamethylene diisocyanate, ethylethylene diisocyanate, trimethylhexane diisocyanate, heptamethylene diisocyanate or diisocyanates derived from dimer fatty acids, such as described in the patents WO 97/49745 and WO 97/49747, especially 2-heptyl-3,4-bis(9-isocyanatononyl)-1-pentylcyclohexane, 1.2-, 1,4- or 1,3-bis(isocyanatomethyl)-cyclohexane, 1,2-, 1,4- or 1,3-bis(2-isocyanatoeth-1-yl)cyclohexane, 1,3-bis(3-iso-cyanatoprop-1-yl)cyclohexane, 1.2-, 1,4- or 1,3-bis(4-isocyanatobut-1-yl)cyclohexane, m-tetramethylxylylene diisocyanate (=1,3-bis(2-isocyanatoprop-2-yl)benzene) or tolylene diisocyanate.

Examples of suitable blocking agents to block the polyisocyanates are the blocking agents known from U.S. Pat. No. 4,444,954, particularly phenols, such as phenol, cresol, xylenol, nitrophenol, chlorophenol, ethylphenol, t-butylphenol, hydroxybenzoic acid, esters of this acid, or 2,5-di-tert-butyl-4-hydroxytoluene; lactams, such as epsilon-caprolactam, delta-valerolactam, gamma-butyrolactam or beta-propiolactam; active methylenic compounds, such as diethyl malonate, dimethyl malonate, ethyl or methyl acetoacetate, or acetylacetone; alcohols, such as methanol, ethanol, n-propanol, isopropanol, n-butanol, isobutanol, t-butanol, n-amylalcohol, t-amyl alcohol, lauryl alcohol, ethylene glycol monomethyl ether, ethylene glycol monoethyl ether, ethylene glycol monobutyl ether, diethylene glycol monomethyl ether, diethylene glycol monoethyl ether, propylene glycol mono methyl ether, methoxymethanol, glycolic acid, glycolic esters, lactic acid, lactic esters, methylolurea, methylolmelamine, diacetone alcohol, ethylene chlorohydrin, ethylenebromohydrin, 1,3-dichloro-2-propanol, 1,4-cyclohexyldimethanol or acetocyanohydrin; mercaptans, such as butyl mercaptan, hexyl mercaptan, t-butyl mercaptan, t-dodecyl mercaptan, 2-mercaptobenzothiazole, thiophenol, methylthiophenol or ethylthiophenol; acid amides, such as acetoanilide, acetoanisidinamide, acrylamide, methacrylamide, acetamide, stearamide or benzamide; imides, such as succinimide, phthalimide or maleimide; amines, such as diphenylamine, phenylnaphthylamine, xylidine, N-phenylxylidine, carbazole, aniline, naphthylamine, butylamine, dibutylamine or butylphenylamine; imidazoles, such as imidazole or 2-ethylimidazole; ureas, such as urea, thiourea, ethyleneurea, ethylenethiourea or 1,3-diphenylurea; carbamates, such as phenyl N-phenylcarbamate or 2-oxazolidone; imines, such as ethyleneimine; oximes, such as acetone oxime, formaldoxime, acetaldoxime, acetoxime, methyl ethyl ketoxime, disobutylketoxime, diacetylmonoxime, benzophenone oxime or chlorohexanone oximes; salts of sulfurous acid, such as sodium bisulfite or potassium bisulfite; hydroxamic esters, such as benzyl methacrylohydroxamate (BMH) or allyl methacrylohydroxamate; or substituted pyrazoles, imidazoles or triazoles; and also mixtures of these blocking agents. The blocking agents are preferably selected so that the blocked isocyanate groups only undergo deblocking, and enter into crosslinking reactions, in precisely the temperature range within which the thermal crosslinking of the coating composition of the invention is to take place, particularly preferred in the temperature range from 120 to 160° C.

Amongst the melamine-formaldehyde resins most preferred are high imino melamine resins.

The high imino melamine resins are similar to high imino methylated melamines in that they are partially methylated and highly alkylated. They differ from methylated melamine resins in the type of alkylation alcohol, and they contain combinations of methoxy sites and n-butoxy sites. The butoxy sites impart improved flow and leveling and intercoat adhesion properties. As in the methylated species, their composition contains primarily alkoxy/imino or alkoxy/NH functionality. The advantages are fast cure response particularly in waterborne formulations at 120 to 150° C. without the need for strong acid catalyst addition, high film hardness and low formaldehyde release on cure. In addition to reacting with hydroxyl, carboxyl and amide functional polymers, the resins also self-condense readily. Therefore, their practical equivalent weight is typically 200 to 250. They are e.g. commercially available from Allnex under the tradename Cymel®, for example as Cymel® 203.

Component (C)

The aqueous, one-pack coating compositions according to the present invention contains at least one polymeric surface-active agent, preferably chosen amongst the group of levelling agents. Most preferably component (C) does not contain any fluorine containing species. Component (C) is different from components (A), (B), (D) and (E).

Component (C) is preferably selected from the group consisting of (meth)acrylic copolymers and polysiloxanes, most preferred from the group of polysiloxanes, even more preferred polyester-modified or polyether-modified polysiloxanes.

Particularly suitable (meth)acrylic copolymers (C) contain carboxy groups and/or polyethylene glycol chains to enhance the compatibility with the aqueous carrier medium.

Particularly suitable polysiloxanes are selected from the group consisting of dialkylpolysiloxanes, (alkyl)(aryl)-polysiloxanes, polyester-modified alkylpolysiloxanes and polyether-modified alkylpolysiloxanes. Particularly preferred are polyether-modified alkylpolysiloxanes, most preferred are polyether-modified methylpolysiloxanes.

The alkyl residues in the before-mentioned polysiloxanes are preferably methyl residues and the aryl residues phenyl residues. The polyether residue(s) contained in the polyether-modified alkylpolysiloxanes preferably comprise moieties selected from polyethylenoxide, polypropyleneoxide or poly(ethylene/propylene)oxide moieties.

The (meth)acrylic copolymers and polysiloxanes of component (C) are e.g. available from Byk Chemie GmbH under the tradename Byk®.

Component (D)

The aqueous, one-pack coating compositions according to the present invention contain at least one component (D) being an organic rheology control agent. Component (D) is different from components (A), (B), (C) and (E).

Component (D) is selected from the group consisting of (meth)acrylic acid-(meth)acrylate copolymer rheology control agents (D1) and polyurethane rheology control agents (D2).

(Meth)acrylic acid-(meth)acrylate copolymer rheology control agents (D1) are those which comprise in copolymerized form, in addition to acrylic acid and/or methacrylic acid, one or more acrylic acid esters (i.e., acrylates) and/or one or more methacrylic acid esters (i.e., methacrylates).

Common to the (meth)acrylic acid-(meth)acrylate copolymer rheology control agents is that in an alkaline medium, in other words at pH levels above 7, more particularly >7.5, they exhibit a sharp increase in viscosity through salt formation by the acrylic acid and/or methacrylic acid, in other words through the formation of carboxylate groups, which is e.g. not the case for polymers of component (A) or polymeric surface-active agents of component (C).

Where (meth)acrylic esters are used that are formed from (meth)acrylic acid and a $C_1$-$C_6$ alkanol, the rheology control agents obtained are substantially non-associative (meth)acrylic acid-(meth)acrylate copolymer rheology control agents. Substantially non-associative (meth)acrylic acid-(meth)acrylate copolymer rheology control agents are also referred to in the literature as ASE rheology control agents (Alkali Soluble/Swellable Emulsion (or dispersion)).

In the present invention, these are preferred as (meth)acrylic acid-(meth)acrylate copolymer rheology control agents.

The most preferred (meth)acrylic acid-(meth)acrylate copolymer ASE rheology control agents are e.g. available under the tradename Rheovis® AS from BASF SE, Ludwigshafen, Germany.

As (meth)acrylic acid-(meth)acrylate copolymer rheology control agents, however, it is also possible to use those known as HASE rheology control agents (Hydrophobically Modified Anionic Soluble Emulsions (or dispersions)). They are obtained when the alkanol or alkanols used, instead of or in addition to the $C_1$-$C_6$ alkanols, include those having a larger number of carbon atoms, such as 7 to 30 carbon atoms, for example, or 8 to 20 carbon atoms. HASE rheology control agents have a substantially associative thickening effect. This is not the case for polymers of component (A) or polymeric surface-active agents of component (C).

Polyurethane rheology control agents (D2) should preferably be understood to be the associative rheology control agents referred to in the literature as HEUR (Hydrophobically Modified Ethylene Oxide Urethane Rheology modifiers). In chemical terms, they are nonionic branched or unbranched block copolymers of polyethylene oxide chains, polypropylene oxide chains or (polyethylene oxide-propylene oxide) chains, which are linked to one another via urethane bonds and which carry terminal long-chain alkyl or alkenyl groups having 8 to 30, preferably 10 to 24 and more preferably 12 to 20 carbon atoms or aryl groups or alkylated aryl groups having 6 to 30, preferably 6 to 20 carbon atoms. Typical alkyl groups are for example dodecyl or stearyl groups; an example of a typical alkenyl group is an oleyl group; a typical aryl group is the phenyl group; and an example of a typical alkylated aryl group is a nonylphenyl group. On account of their thickening properties and structure, the polyurethane rheology control agents used in accordance with the invention are not suitable as component (A). They are therefore explicitly different from all other possible polyurethanes that may be used in the coating material compositions of the invention.

The most preferred polyurethane HEUR rheology control agents are e.g. available under the tradename Rheovis® PU from BASF SE, Ludwigshafen, Germany.

As organic rheology control agent (D) it is also preferred to use a combination of a (meth)acrylic acid-(meth)acrylate copolymer rheology control agent and a polyurethane rheology control agent. It is particularly preferred to employ an (meth)acrylic acid-(meth)acrylate copolymer ASE rheology control agent in combination with a polyurethane HEUR rheology control agent in the coating composition of the present invention.

Further Components (E)

Conventional Coatings Additives (E1)

The coating composition of the present invention may contain one or more commonly used coatings additives, solvents or pigments/fillers as further component (E) depending on the desired application. Except for the pigments and filler and the volatile solvents, the additives remaining in the cured coating belong to the binder of the coating composition.

Thus, the coating composition may comprise at least one additive selected from the group consisting of reactive diluents, light stabilizers, antioxidants, deaerators, emulsifiers, slip additives, polymerization inhibitors, initiators for free-radical polymerizations, adhesion promoters, film-forming auxiliaries, sag-control agents (SCA), flame retardants, corrosion inhibitors, siccatives, biocides and matting agents. Further examples of suitable coatings additives are described in the textbook "Lackadditive" ("Additives for Coatings" by Johan Bieleman, Wiley-VCH, Weinheim, 1998). The additives can be used in the known and customary amounts. Most preferably the coating composition contains at least one defoamer, preferably from the group of phosphorous-containing defoamers, even more preferred from the group of trialkyl phosphates, such as triisobutyl phosphate and tri(n-butyl) phosphate. If a defoamer is present, the amount of defoamer, preferably the phosphorous containing defoamer, and even more preferred the trialkyl phosphate defoamer, such as the triisobutyl phosphate and/or tri(n-butyl) phosphate, is in the range from 0.2 to 5 wt.-%, more preferred 0.5 to 4 wt.-% and most preferred 1.0 to 3 wt.-% based on the total weight of the coating compositions.

Preferably, their content, based on the total weight of the coating composition of the invention ranges from 0.5 to 3 wt.-%, more preferably 1.0 to 2.8 wt.-%, particularly preferably 1.5 to 2.5 wt.-%.

Organic Solvents (E2)

In addition to water as the main liquid carrier medium of the aqueous, one-pack coating compositions of the present invention, the compositions may also comprise organic solvents in amounts being typical of those found in common aqueous coating compositions.

The amount of organic solvents, based on 1 L of the coating composition according to the invention, is preferably in the range from 100 to 200 g/L, more preferably in the range from 110 to 180 g/L and most preferred in the range from 110 to 150 g/L.

Pigments, Fillers and Dyes (E3)

Preferably the coating compositions according to the present invention contain pigments, most preferred coloring pigments.

The terms "coloring pigment" and "color pigment" are interchangeable and include colored, black and white pigments. As a color pigment inorganic and/or organic pigments can be used.

Preferably, the color pigment is an inorganic color pigment, most preferred carbon black.

Examples of white pigments are titanium dioxide, zinc white, zinc sulfide and lithopone. Examples of black pigments are carbon black, iron manganese black and spinel black. Examples of colored pigments are chromium oxide, chromium oxide hydrate green, cobalt green, ultramarine green, cobalt blue, ultramarine blue, manganese blue, ultramarine violet, cobalt and manganese violet, iron oxide red, cadmium sulfoselenide, molybdate red and ultramarine red, iron oxide brown, mixed brown, spinel and corundum phases and chromium orange, iron oxide yellow, nickel titanium yellow, chrome titanium yellow, cadmium sulfide, cadmium zinc sulfide, chrome yellow and bismuth vanadate.

Preferably, the aqueous coating composition according to the invention contains as pigment or pigments exclusively one or more color pigments.

Most preferable no effect pigments, particularly not metal effect pigments or pearlescent effect pigments are comprised in the coating composition according to the invention. Most preferred the coating composition according to the invention does not comprise any platelet-shaped pigments such as the before-mentioned platelet-shaped effect pigments or other platelet-shaped pigments such as platelet-shaped graphite or platelet-shaped iron oxide.

If present, the proportion of the color pigments in the coating composition is preferably in the range from 0.05 to 1.5% by weight, preferably 0.1 to 1.2% by weight, particularly preferably 0.2 to 1.0% by weight, in each case based on the total weight of the aqueous coating composition.

The term "filler" is known to the person skilled in the art, for example from DIN 55943 (date: October 2001). For the purposes of the present invention, a "filler" is understood as meaning a substance which is essentially insoluble in the application medium, for example the coating composition according to the invention and which is used in particular for increasing the volume. In the context of the present invention, "fillers" preferably differ from "pigments" by their refractive index, which is $\leq 1.7$ for fillers, but $>1.7$ for pigments. Examples of suitable fillers are kaolin, dolomite, calcite, chalk, calcium sulfate, barium sulfate, talc, silica, in particular pyrogenic silica, hydroxides such as aluminum hydroxide or magnesium hydroxide; in addition, reference is made to Römpp Lexikon Lacke und Druckfarben, Georg Thieme Verlag, 1998, pages 250 ff., "Fillers".

If present, the proportion of fillers in the coating composition is preferably in the range from 0.05 to 1.5% by weight, preferably 0.1 to 1.2% by weight, particularly preferably 0.2 to 1.0% by weight, in each case based on the total weight of the aqueous coating composition.

Preferably, none of components (A), (B), (C), (D) and (E) contains fluorine-containing species. Thus, most preferably the aqueous, one-pack coating compositions of the present invention are fluorine-free.

Total Solids Content

The total solids content of all the nonvolatile components is in the range from 7.5 to 11.5% by weight, preferably 7.8 to 11.0% by weight and more preferred 8.0% to 10.5% by weight, based in each case on the total weight of the composition of the invention.

pH Value of the Aqueous, One-Pack Coating Compositions According to the Invention Preferably, the pH value of the aqueous, one-pack coating compositions according to the invention at 23° C. is in the range from 7 to 10, more preferred from 7.5 to 9.5 and most preferred from 8.0 to 9.0.

Preferred Aqueous, One-Pack Coating Compositions According to the Invention

Preferably the aqueous, one-pack coating composition according to the invention comprises (A) at least one polymer selected from the group consisting externally crosslinkable polymers;

(B) at least one crosslinking agent for crosslinking the at least one polymer (A);

(C) at least one polymeric surface-active agent selected from the group of polysiloxanes, and (D) at least one organic rheology control agent selected from the group of (meth)acrylic acid-(meth)acrylate copolymer rheology control agents (D1) and optionally (E) at least one non-platelet-shaped pigment.

More preferably the aqueous, one-pack coating composition according to the invention comprises (A) at least one polymer selected from the group consisting externally crosslinkable hydroxyfunctional polymers selected from the group consisting of polyurethanes, polyesters and poly(meth)acrylic resins and copolymers of said polymers;

(B) at least one crosslinking agent for crosslinking the at least one polymer (A) selected from the group consisting of blocked polyisocyanates and aminoplast resins;

(C) at least one polymeric surface-active agent selected from the group of polyester-functional polysiloxanes and polyether-functional polysiloxanes, and (D) at least one organic rheology control agent selected from the group of (meth)acrylic acid-(meth)acrylate copolymer rheology control agents (D1) and optionally (E) at least one non-platelet-shaped pigment.

Most preferably the aqueous, one-pack coating composition according to the invention comprises (A) at least one polymer selected from the group consisting externally crosslinkable hydroxyfunctional polymers selected from the group consisting of polyurethanes, polyesters and poly(meth)acrylic resins and copolymers of said polymers;

(B) at least one crosslinking agent for crosslinking the at least one polymer (A) selected from the group consisting of aminoplast resins;

(C) at least one polymeric surface-active agent selected from the group of polyether-functional polysiloxanes, and (D) at least one organic rheology control agent selected from the group of (meth)acrylic acid-(meth)acrylate copolymer rheology control agents (D1) and (E) at least one non-platelet-shaped pigment, most preferred a black pigment such as a carbon black pigment.

Generally, the components (A) to (E) can be chosen independently of each other, with the exception that the component (A) i.e the at least one externally crosslinkable polymer and the respective component (B) i.e. the at least one crosslinking agent have to be selected to have complementary reactive groups, because otherwise external crosslinking could not occur.

Thus, any component (A) to (E) of the before-mentioned preferred, more preferred and most preferred aqueous, one-pack coating composition according to the invention can be further limited with even further preferred embodiments of the respective component as indicated in the respective section describing the component in more detail.

The aqueous, coating composition according to the invention does not contain platelet-shaped particulate material having a median particle size $D_{50}$ (determined by laser diffraction) of 2 μm or more, preferably of 1.8 μm or more, more preferably 1.5 μm or more and most preferred 1 μm or more. Further preferred, the aqueous, coating composition according to the invention does not contain platelet-shaped particulate material having a median particle size $D_{50}$ (determined by laser diffraction) of 2 μm or more, preferably of 1.8 μm or more, more preferably 1.5 μm or more and most preferred 1 μm or more.

Irrespective of the fact that components (A) to (E) may contain one or more than one ingredient, each being subsumable under the definition of the respective component, the total amount of the respective component preferably ranges for component (A) from 30 to 70 wt.-%, more preferred from 40 to 60 wt.-% and most preferred from 55 to 65 wt.-% based on the total solids content of the coating composition according to the invention;

component (B) from 0 wt.-%, if component (A) is completely self-crosslinkable, more preferred, if component (A) is externally crosslinkable from 0.5 to 30 wt.-% and most preferred from 6 to 15 wt.-% based on the total solids content of the coating composition according to the invention;

component (C) from 4 to 22 wt.-%, more preferred from 6 to 20 wt.-% and most preferred from 8 to 19 wt.-% based on the total solids content of the coating composition according to the invention;

component (D) from 6 to 11 wt.-%, more preferred from 6.5 to 10 wt.-% and most preferred from 7.0 to 9 wt.-% based on the total solids content of the coating composition according to the invention;

component (E) from 0.1 to 20 wt.-%, more preferred from 2 to 15 wt.-% and most preferred from 6 to 10 wt.-% based on the total solids content of the coating composition according to the invention.

It is possible to combine any of the above ranges disclosed for one component with any range disclosed for another component as long as the total solids amount is within the claimed ranges.

Physical Properties of the Aqueous, One-Pack Coating Compositions

The viscosity of the aqueous, one-pack coating composition according to the invention at 23° C. and at a shear rate of 0.1 $s^{-1}$ is from 2000 mPas to 12000 mPas, preferably from 3000 mPas to 10000 mPas and more preferred from 4000 mPas to 9000 mPas.

Preferably, the surface tension in $mJ/m^2$ of the liquid coating composition ranges from 22 to 32 $mJ/m^2$, more preferred from 24 to 28 $mJ/m^2$ and most preferred from 25 to 27 $mJ/m^2$.

Process for Preparing the Aqueous, One-Pack Coating Compositions of the Invention The compositions of the invention are produced in that the above-described constituents (A), (B), (C) and (D) and also optionally (E), are dispersed in an aqueous medium, more particularly in a liquid carrier medium containing water as main ingredient, and then the resulting mixture is homogenized. Viewed in terms of method steps, the process of the invention has no peculiarities but can instead be carried out using the customary and known mixing techniques and mixing assemblies, such as stirred tanks, dissolvers, agitator mills, kneading devices, static mixers or extruders.

Method of Coating a Substrate

The aqueous coating composition according to the invention can be used in a method for producing a single-layer coating, but also and preferred for producing multi-layer coating coatings.

Producing a Single-Layer Coating

The aqueous, one-pack coating composition according to the invention is applied to a substrate by a method comprising:

a. emitting a jet of the aqueous, one-pack coating composition according to the invention from an application device, wherein, after emerging from the application device, the coating composition jet has a continuous region in the jet direction until said jet reaches a disintegration distance, whereupon, after the disintegration distance, the coating composition jet then disintegrates into droplets that are separate from one another in the jet direction; and b. positioning the application device at a specified application distance from the substrate which is to be coated so that the coating composition jet impacts on the substrate and coats the substrate to obtain a coating layer; wherein c. the application distance is smaller than the disintegration distance of the coating composition jet, so that the coating composition jet impacts on the substrate with its continuous region; or alternatively, and less preferred, wherein the application distance is larger than the disintegration distance of the coating composition jet, so that the separate droplets formed impact on the substrate.

A suitable application device to carry out the above method is described in detail in US 2013/0284833 A1, and particularly preferred in US 2015/0375258 A1. Such application devices ("stripe applicating machine") are e.g. commercially available from DEMCON systec industrial systems GmbH, Münster-Roxel, Germany.

In step c. above, the first alternative, i.e. the use of an application distance which is smaller than the disintegration distance of the coating composition jet, so that the coating composition jet impacts on the substrate with its continuous region, is preferred. It significantly improves the sharpness of the edges, particularly if the coating composition is applied to cover only a part of the substrate.

Thus, the method above is particularly suitable, if the coating composition jet is applied to form a pattern on the substrate, for example, a stripe (e.g., design stripes, decorative stripes). However, the concept of a pattern used in the context of the present invention is to be under stood generally and is not restricted to stripes. For example, the pattern can also be a graphic design, for example, a silhouette of a jumping horse on a motor vehicle bonnet or a chequered flag on the roof of a motor vehicle body.

Thus, in contrast to conventional atomizing methods by means of rotary atomizers, with the application method according to the present invention, a sharp-edged pattern can be achieved, which is important for a high-quality impression. Firstly, the concept of a sharp-edged pattern used within the context of the present disclosure means that the edge of the pattern has very small deviations in relation to a pre-defined edge form, which are preferably smaller than 0.5 mm, smaller than 0.2 mm or even smaller than 0.1 mm. Secondly, the expression "sharp-edged pattern" used in the context of the present disclosure also means that, outside of the coated pattern, no coating medium splashes impact on the surface to be coated.

The above method according to the present invention is also suitable for areal component coating. For this purpose, the coating composition jet can be moved over the substrate a plurality of times, a coating composition strip being applied in each case. In this way, by means of a meandering guidance of the coating composition jet, numerous parallel coating composition strips can be applied.

It is to be understood that the individual coating composition strips can merge into one another and then form a uniform strip or a uniform coating composition layer.

Alternatively, it is also possible that the individual coating composition strips do not merge into one another, but rather, in the finished state, form two or more separate strips.

As mentioned above that the expression "pattern" as used in the context of the present invention can refer to a stripe that is applied to the surface of a substrate. Using the application method according to the present invention, extremely narrow strips can advantageously be applied, having a width of less than 1 cm, 5 mm, 2 mm, 1 mm, 500 µm or even less than 200 µm such as 100 µm.

It is also to be understood, that the application device may not only emit a single coating composition jet, but may also emit a plurality of coating composition jets that are oriented substantially parallel to one another. The distance between the directly adjacent coating composition jets may be large enough that the directly adjacent coating composition jets do not merge between the application device and the substrate, but impact on the substrate surface as separate coating medium jets, but still merge into one area on the substrate.

The application device may have a plurality of application nozzles which have a particular nozzle internal diameter and are arranged at a particular nozzle spacing providing for the emission of the individual coating composition jets. To prevent merging of adjacent coating composition jets between the application nozzles and the substrate surface, the nozzle spacing between the directly adjacent application nozzles may be at least equal to three times, four times or six times the nozzle internal diameter.

Furthermore, the possibility exists within the scope of the present invention that the individual application nozzles or regions with a plurality of nozzles can be controlled independently of one another, so that the coating composition jets emerging from the individual application nozzles have different operating variables. For example, the emission velocity of the coating medium from the application nozzles, the type of coating composition, including differently colored coating compositions or the volume flow rate of the emitted coating composition can be individually set for the individual application nozzles or regions.

It is also possible that the application device is moved relative to the substrate during the application of the coating composition, so that the coating composition jet moves along a corresponding strip with the impact point thereof on the substrate surface. Alternatively, the application device can be arranged in a fixed position while the substrate is moved. Furthermore, the relative movement between the application device and the substrate to be coated can be achieved in that both the application device and the substrate to be coated are moved.

An advantage of the above application method according to the present disclosure lies in avoiding overspray and/or in increasing the application efficiency, i.e., the proportion of the applied coating composition which is actually deposited on the substrate surface. The coating composition jet is therefore preferably only switched on when the coating composition jet also actually impacts on the substrate surface. During the coating of a substrate with a lateral edge, the application device may be therefore moved toward the edge in the lateral direction with the coating composition jet switched off. The coating composition jet is then only switched on when the application device is situated over the edge, so that the switched-on coating composition jet then actually impacts on the substrate. Subsequently, the application device is moved over the substrate to be coated along the substrate surface to be coated to apply a corresponding strip of the coating composition. The coating composition jet is then switched off again when the application device is moved across a lateral edge of the substrate to be coated, since the coating composition jet would then no longer impact on the substrate surface.

More details on possibilities on how to carry out the method above, and particularly the first alternative of step c.; and also, the application device which can be used therefore, are found in US 2015/0375258 A1.

Since, in the first alternative of step c. of the above method, the coating composition jet hits the substrate before it disintegrates into droplets naturally (natural disintegration according to Rayleigh as is known), it is not necessary to apply means to disintegrate the coating composition jet such as vibrations in order to produce droplets.

In the second alternative of step c. of the above method, the application distance is larger than the disintegration distance of the coating composition jet, so that the separate droplets formed impact on the substrate. The aqueous, one-pack coating compositions according to the present invention can also be advantageously employed in such method. More details on possibilities on how to carry out the method above, and particularly the second alternative of step c.; and also, the application device which can be used therefore, are found in US 2013/0284833.

The coated substrate obtained in the above method of producing a single-layer coating is applied in a dry layer thickness in the range from 10 to 30 µm, more preferably in a dry layer thickness in the range from 12 to 25 µm and most preferably in a dry layer thickness from 15 to 20 µm. Preferably, if the coating composition contains one or more pigments, the layer thickness is preferably sufficiently high to opaquely cover the substrate.

Subsequently to step c. of the above method, the obtained coating layer is, in an optional, but preferred subsequent step d., at least partially dried at a temperature preferably ranging from 20 to 80° C. and more preferably ranging from 25 to 70° C. The drying times may preferably vary in the range from 1 to 30 min, more preferably 2 to 15 min and most preferred 3 to 10 min. Typically, the higher the drying temperature, the lower the drying time required.

Subsequently to step c. or the drying step d. the obtained, preferably at least partially dried coating layer is cured at a temperature preferably ranging from 40 to 90° C., more preferably ranging from 50 to 80° C. and most preferably ranging from 60 to 70° C. The curing times may preferably vary in the range from 3 to 120 min, more preferably 5 to 60 min and most preferred 7 to 15 min. Typically, the higher the curing temperature, the lower the curing time required.

The substrates to be coated are preferably plastic, i. e. polymeric or metallic substrates. However, it is also possible to coat other types of substrates such as ceramic substrates, or glass. Polymeric substrates have to withstand the drying and curing conditions. Most preferred are metallic substrates like as steel, such as cold rolled steel, galvanized steel, zinc and aluminum and alloys of the same, such as aluminum/magnesium alloys and plastic substrates, such as polypropylene (PP), polyethylene (PE), acrylnitrilbutadienstyrol (ABS) and ethylene propylene diene monomer rubber (EPDM). Preferred substrates are parts of motor vehicles such as automotive bodies and automotive body parts.

Producing a Multi-Layer Coating

Preferably, the afore-mentioned process for producing a single-layer coating is integrated as at least one step of a multi-step process for producing a multi-layer coating. In such multi-layer coating, the substrate in the single layer coating method may be a substrate which is already coated with one or more of a conversion coating layers, an electrodeposition coating layer, particularly preferred a cathodic electrodeposition coating layer, a filler coating layer and/or primer coating layer and a basecoat layer. The term "filler coating" is not to be confused with the term "filler", since a "filler coating" is obtained from a so-called filler coating composition. The substrates are the same as those described for the single-layer coating. However, for conversion coating and electrodeposition coating metallic substrates are required.

With very particular preference, the multi-layer coatings are produced by the following method, comprising 1) optionally applying an electrodeposition coating composition to an optionally conversion-coated metallic substrate and curing the electrodeposition coating to obtain an electrodeposition coating layer; subsequently 2) optionally applying at least one filler coating composition and/or primer coating composition onto the preceding coating layer or on a substrate to obtain one or more filler coating layer(s) and/or primer coating layers and preferably at least partially curing the filler coating layer(s) and/or primer coating layers; subsequently 3) optionally applying at least one basecoat composition and/or at least one clear coat composition onto the preceding coating layer or on a substrate to obtain at least one basecoat layer and/or at least one clear coat layer, preferably drying and/or at least partially curing the basecoat layer(s) and/or clearcoat layer(s); subsequently 4) applying at least one aqueous, one-pack coating composition according to the invention by the method as described above for producing a single-layer coating onto at least part of the preceding layer or on a substrate to obtain a coating layer, preferably drying and/or at least partially curing the thus obtained coating layer(s); and subsequently 5) preferably applying at least one clearcoat composition onto the coating layer(s) obtained in the preceding step; and 6) jointly curing all layer that were not cured in any of the preceding steps;

whereby—beside step 4)—at least one of steps 1), 2), 3) and 5) is carried out.

Preferably, steps 1), 2), 4), 5) and 6) are carried out; and even more preferred steps 1) to 6) are carried out in the method of coating a substrate to produce a multi-layer coating according to the invention.

A particularly preferred embodiment is to carry out at least steps 3), 4), 5) and 6), wherein in step 3) at least one clearcoat composition is applied, preferable wherein in step 3) only one clearcoat composition is applied. In such embodiment it is further preferred that the substrate is a plastic substrate. Further preferred in this method is that steps 3), 4), 5) and 6) are carried out and that in step 3) a clearcoat composition is applied on a plastic substrate, which is optionally precoated according to step 2) and/or precoated with a basecoat according to step 3).

In the process of the invention for producing a multi-layer coating, the individual coating layers, particularly preferred the layers applied in steps 4) and 5) are preferably applied by what is called the wet-on-wet method. In a wet-on-wet method a subsequent layer is applied to a preceding layer without (fully) curing the preceding layer. Examples of such wet-on-wet methods are known from German patent application DE 19948 004 A1, page 17 line 37 to page 19 line 22.

Preferably the aqueous, one-pack coating composition according to the present invention is used in step 4) as an aqueous basecoat composition for producing a basecoat layer, particularly a colored, preferably black basecoat layer, as part of the multi-layer coating, preferably multi-layer coating for motor vehicles, more particularly automobiles. Step 4) is carried out as described for the method of producing a single-layer coating. i.e. the therein describes steps a., b. and c., preferably the first alternative of step c.

The electrodeposition coating layer as formed in optional step 1) is preferably produced from a cathodic electrodeposition coating composition in an electrodeposition dip coating process. Such compositions are based on cathodically depositable poly(meth)acrylate resins or epoxy-amine resins, and crosslinking agents selected from the group consisting of blocked polyisocyanates as disclosed above. A preferred dry layer thickness of the electrodeposition coating layer ranges from 15 µm to 25 µm.

The electrodeposition coating layer is preferably cured before any other layer is applied thereon. The curing temperature preferably ranges from 100 to 250° C., more preferred from 140 to 220° C. and the curing time preferably ranges from 5 to 50 min, more preferred from 10 to 40 min.

As filler coating composition(s) and/or primer coating compositions to be used in optional step 2) any filler coating compositions and primer coating compositions known to one of skill in the art can be used. They are preferably applied by means of electrostatic spray coating. Preferably, such coating compositions used to produce the filler coating layer(s) and/or primer coating layer(s) are solvent-based or aqueous, one- or two pack compositions. A preferred dry layer thickness of the coating layers obtained in step 2) ranges from 15 µm to 45 µm, more preferred 20 µm to 40 µm and most preferred from 25 µm to 35 µm. The drying temperature preferably ranges from 20 to 70° C., more preferred from 25 to 50° C. and the drying time preferably ranges from 2 to 30 min, more preferred from 5 to 15 min. The curing temperature preferably ranges from 140 to 180° C., more preferred from 150 to 170° C. and the curing time preferably ranges from 10 to 40 min, more preferred from 15 to 30 min.

The non-inventive basecoat compositions and/or clearcoat compositions as used in optional step 3) can be any basecoat compositions or clear coat compositions known to one of skill in the art. They are preferably applied by means of electrostatic spray coating. Preferably, the basecoat compositions used to produce the basecoat layer in step 3) are solvent-based or aqueous, one pack or two pack compositions. Preferably, the clearcoat compositions used to produce the clearcoat layer in step 3) are solvent-based or aqueous, one pack or two pack compositions. A preferred dry layer thickness of the coating layers obtained in step 2) ranges from 5 µm to 30 µm, more preferred 10 µm to 25 µm and most preferred from 15 µm to 20 µm. The drying temperature preferably ranges from 20 to 70° C., more preferred from 25 to 50° C. and the drying time preferably ranges from 2 to 30 min, more preferred from 5 to 15 min. The curing temperature preferably ranges from 140 to 180° C., more preferred from 150 to 170° C. and the curing time preferably ranges from 10 to 40 min, more preferred from 15 to 30 min.

As clearcoat composition(s) to be used in optional step 5) any clearcoat compositions known to one of skill in the art can be used. They are preferably applied by means of electrostatic spray coating. Preferably, the clearcoat compositions used to produce the clearcoat layer are solvent-based or aqueous, one- or two pack compositions, preferably solvent-based two-pack compositions. A preferred dry layer thickness of the coating layers obtained in step 2) ranges from 30 µm to 60 µm, more preferred 35 µm to 55 µm and most preferred from 40 µm to 50 µm. The drying temperature preferably ranges from 20 to 70° C., more preferred from 25 to 50° C. and the drying time preferably ranges from 2 to 30 min, more preferred from 5 to 15 min. The curing temperature preferably ranges from 130 to 170° C., more preferred from 140 to 160° C. and the curing time preferably ranges from 15 to 45 min, more preferred from 20 to 35 min.

Coated Substrate

Further object of the invention is a coated substrate, which is obtainable according to the methods for producing a single-layer coating or multi-layer coating according to the invention.

In the following the present invention will be explained in more detail by use of working examples and comparative examples.

EXAMPLES

As far as not indicated otherwise, in the following, any part are parts by weight and any percentages are in percent by weight.

Determination of Properties

Solids Content

Solids content of the coating composition was calculated according to DIN ISO 3251 by drying a 1.0 g sample of the coating composition at 130° C. for 60 min. The residual amount in g multiplied by 100 gives the solids content of the coating composition in percent by weight.

Viscosity

The viscosity of the coating compositions was determined at 23° C. using a rotational viscosimeter (Anton Paar Rheolab QC) at a shear rate of 0.1 s$^{-1}$, 1 s$^{-1}$ and 1000 s$^{-1}$, respectively. All measurements have been conducted by employing a cone-plate measuring system dedicated to the specific Anton Paar equipment.

Surface Tension—Liquid Paint Sample Measurement

The surface tensions of the liquid paint samples were determined with a tensiometer (Kruiss K12). The reported value is the corrected value according to DIN EN 14370.

Evaluation of the Abutting Edge ("Stosskantenbeurteilung") with µ-Surf

The evaluation of the abutting edge is determined by determination of the S$_a$ value (average surface roughness) according to EN ISO 25178 (using a µ-Surf device, commercially available from NanoFocus). The average surface roughness is determined in the brush and the overlapping region of two brushes. The resulting difference was used to determine the visual appearance. If the difference is less than 0.04 µm the visual appearance was rated "1" (which is very good), from 0.04 to 0.08 µm it was rated "3" (which is good with limitations) and if the difference was >0.08 µm it was rated "5" (which is not okay).

Levelling in the Brush/Visual Appearance

Visual evaluation of appearance panels is pursued in a special room equipped with special angle adjustable lightnings and dark, non-reflective walls. The evaluation is done at a defined angle of 29°, all panels are fixed for evaluation on a respective sampler equipped with adjustable levels, respectively. All panel are evaluated visually at different distance from very near distance to 3 meters at varying light intensities to be sure that all patterns on the panel have been illuminated in an optimum way.

The respective rankings have been as follows:

ok=complete wetting within the brush, no abnormalities, no inhomogeneities nok=no wetting or incomplete wetting within the brush, inhomogeneous appearance Median Particle Size D$_{50}$ The median particle size is measured by laser diffraction according to ISO 13320-1:1999). Particularly suitable for this purpose is, for example, the Malvern Mastersizer 3000 equipped with Aero S unit using general purpose tray with hopper (hopper gap 2 mm) with the following settings:

Background measurements duration 10 s

Sample measurements duration 10 s

Number of measurements: at least 9 till the stabilization of result (averaging of the last 3 reproducible experiments)

Obscuration range: 1-10%

Feed rate: 40%

Air pressure: 1.5 bar

Analysis model: general purpose

Evaluation model: Fraunhofer

Result units: Volume

Only homogeneous powders, free of visible agglomerates, were employed.

Preparation of Black Aqueous Basecoat Compositions

Preparation of a Black Pigment Paste (Carbon Black Paste—Example A)

The carbon black paste was prepared by mixing 57 parts by weight of polyurethane dispersion (binder dispersion A according to WO 92/15405), 5 parts by weight of a hydroxy-functional polyester (according to DE-A-4009858), 10 parts by weight of carbon black (Monarch® 1400), 6.5. parts by weight of dimethyl ethanolamine (10 wt.-% in water), 2.5 wt.-% of a commercially available polyether (Pluriol® P900), 7.5 wt.-% of butyl diglycol and 12 parts by weight of de-ionized water.

Preparation of the Basecoat Compositions BC-C1, BC-C2, BC-I1 and BC-I2

In the order shown table 1A the ingredients were mixed to form a black aqueous basecoat composition. After stirring for 10 min de-ionized water and N,N-diethyl ethanolamine were added to obtain a pH value as shown in table 1B and the respective viscosities in table 1B.

Application of the Black Aqueous Coating Compositions

A steel panel (57×20 cm, according to DIN EN ISO 28199-1, item 8.1, embodiment A) coated with a standard cathodic electrodeposition coating material (CathoGuard® 800 from BASF Coatings GmbH) was coated with a commercially available filler coating composition (SecuBloc, FU657100 commercially available from BASF Coatings GmbH) in a layer thickness of 30±5 μm. The coating was allowed to pre-dry at room temperature for 10 min and cured at 160° C. for 20 min in a convection oven.

Subsequently, a commercially available first basecoat composition (FW70-7Z7G from BASF Coatings GmbH) was applied electrostatically in a layer thickness of 15±5 μm. The base coat was pre-dried for 5 min at room temperature and further for 7 min at 70° C. in a convection oven.

Subsequently basecoat compositions BC-C1, BC-C2, BC-I1 and BC-I2, respectively were applied using an application device from Systec (in accordance with the method described in DE 10 2013 002 412 A1) in a layer thickness of 15±2 μm. The second basecoat layer was again pre-dried for 5 min at room temperature and further for 7 min at 70° C. in a convection oven.

Subsequently, a commercially available 2-pack clear coat (ProGloss, FF99-0363, from BASF Coatings GmbH) was electrostatically applied in a film thickness of 45±5 μm. The clearcoat layer was pre-dried for 5 min at room temperature and cured for 25 min at 140° C. in a convection oven.

The evaluation of the properties of the cured multilayer coating were determined as described above.

Further Inventive and Comparative Basecoat Compositions

All further basecoat compositions and coatings were prepared and evaluated in the same manner as described above. The respective formulations and data are found in Tables 2A, 2B, 3A, 3B and 4.

TABLE 1A

| Components | Coating Compositions/amounts in parts-by-weight | | | |
| --- | --- | --- | --- | --- |
| | BC-C1 | BC-C2 | BC-I1 | BC-I2 |
| aqueous suspension of 3 wt.-% Na—Li—Mg layered silicate and 3 wt.-% polypropylene glycol ($M_n$ 900) | 15.8 | — | — | — |
| deionized water | — | 17.2 | 17.2 | 12.2 |
| polyurethane dispersion VD1 (WO 92/15405, p. 15, ll. 16-20) | 23.8 | 5.8 | — | — |
| acrylic resin (WO2018/011311; pp. 72-73, Table A, Example wD BM2) | — | — | 9.2 | — |
| polyurethane (WO2018/011311; pp. 75-76, Example PD1) | — | — | — | 8.5 |
| hydroxyfunctional polyester (DE-A-4009858, Example D, col. 16, ll. 37-59) | 7.0 | 2.1 | 2.1 | 1.74 |
| Aliphatic urethane-acryl hybrid (aqueous; Daotan ® 6464 from Allnex) | — | 2.8 | — | — |
| melamine formaldehyde resin (Maprenal ® MF 909 from Ineos) | 4.5 | — | — | — |
| melamine formaldehyde resin (Cymel ® 203 from Allnex) | — | 2.2 | 2.2 | 1.83 |
| 2,4,7,9-tetramethyl-5-decin-4,7-diol (52 wt.-% in butylglycol) (defoamer and wetting agent) | 0.8 | 0.8 | 0.8 | 0.66 |
| N,N-dimethylethanolamine (10 wt.-% solution in water) | 1.2 | 2.0 | 2.7 | 3.68 |
| butylglycol | 6.4 | 4.0 | 4.0 | 7.34 |
| hydroxyfunctional polyurethane modified polyacrylate (DE4437535A1; p. 7, l. 55-p. 8, l. 23) | 3.0 | 1.3 | 1.3 | 1.1 |
| polyurethane rheology control agent (10 wt.-% solution of Rheovis ® PU 1250 from BASF SE) | 0.6 | — | — | — |
| polyurethane rheology control agent (50 wt.-% solution of Rheovis ® PU 1250 from BASF SE) | — | 1.7 | 1.7 | — |
| deionized water | — | — | — | 10.0 |
| acrylic copolymer emulsion rheology control agent (10 wt. % solution of Rheovis ® AS 1130 30 wt. %, BASF SE) | — | 17.0 | 25.0 | 24.9 |
| Triisobutylphosphate (defoamer) | — | 2.0 | 2.0 | 1.6 |
| polyether-modified polysiloxane | — | 1.0 | 1.0 | 1.24 |
| polypropylene glycol ($M_n$ 900) | 1.5 | — | — | — |
| 2-ethylhexanol | 0.5 | — | — | — |
| 2-amino-2-methylpropanol-p-toluenesulfonate (44 wt.-% solution in isobutanol) | 0.4 | — | — | — |

TABLE 1A-continued

| | Coating Compositions/amounts in parts-by-weight | | | |
| Components | BC-C1 | BC-C2 | BC-I1 | BC-I2 |
| --- | --- | --- | --- | --- |
| carbon black paste (see Example A) | 12.5 | 4.0 | 4.0 | 8.84 |
| deionized water | 22.0 | 38.8 | 28.5 | 16.37 |
| Sum | | | | |

TABLE 1B

| | Coating Compositions | | | |
| Properties of the Coating Compositions | BC-C1 | BC-C2 | BC-I1 | BC-I2 |
| --- | --- | --- | --- | --- |
| solids content in % | 20.3 | 7.1 | 9.5 | 9.0 |
| volatile organic content in g/L | 139.4 | 111.8 | 112.3 | 172.2 |
| wt.-% rheology control (D) agent based on total solids | 0 | 7.2 | 7.9 | 8.3 |
| wt.-% polymeric surface-active agent (C) based on total solids | 0 | 12.1 | 9.1 | 11.8 |
| pH value | 8.1 | 8.4 | 8.6 | 8.5 |
| viscosity in mPas   at 1000 s$^{-1}$ | 120 | 86 | 52 | 55 |
|   at 1 s$^{-1}$ | 678 | 1263 | 1023 | 1472 |
|   at 0.1 s$^{-1}$ | 1020 | 3619 | 6457 | 7568 |
| Quotient of viscosity at 1000 s$^{-1}$/viscosity at 0.1 s$^{-1}$ | 8.5 | 42 | 124 | 138 |

| properties of the cured coating from | BC-C1 | BC-C2 | BC-I1 | BC-I2 |
| --- | --- | --- | --- | --- |
| surface tension in mJ/m$^2$ | 29.3 | 26.1 | 26.4 | 26.0 |
| abutting edge μ Surf | 5 | 5 | 1 | 1 |
| levelling in the brush | nok | nok | ok | ok | ok: okay nok: not okay abutting edge μ surf 1 = very good, 2 = good, 3 = acceptable, 4 = bad, 5 = very bad As shown in Table 1B only the substrates coated with the inventive basecoats showed a satisfying appearance at the abutting edge and an excellent levelling in the brush. The substrates coated with the comparative basecoat composi- tions having a volume solids content above (BC-C1) and below (BC-C2) the claimed range do not provide satisfying results. All inventive examples showed a sharp-edged pat- tern and no overspray was produced. Furthermore, it is observed that the compositions according to be invention possess a relatively high viscosity at a low shear rate (representing the state of the coating directly after applica- tion on the substrate), thus preventing sagging, while the viscosity is low at high shear rates (application viscosity).

TABLE 2A

| | Coating Compositions/amounts in parts-by-weight | | | | | |
| Components | BC-C3 | BC-C4 | BC-C5 | BC-C6 | BC-I3 | BC-I4 |
| --- | --- | --- | --- | --- | --- | --- |
| deionized water | 10.7 | 14.0 | 18.4 | 21.3 | 11.8 | 12.4 |
| 2,4,7,9-tetramethyl-5-decin-4,7-diol (52 wt.-% in butylglycol) (defoamer and wetting agent) | 0.4 | 0.5 | 0.6 | 0.7 | 0.4 | 0.4 |
| polyurethane (WO2018/011311; pp. 75-76, Example PD1) | 7.5 | 9.7 | 12.8 | 14.8 | 8.2 | 8.6 |
| hydroxyfunctional polyester (DE-A-4009858, Example D, col. 16, II. 37-59) | 1.5 | 2.0 | 2.6 | 3.1 | 1.7 | 1.8 |
| melamine formaldehyde resin (Cymel ® 203 from Allnex) | 1.6 | 2.1 | 2.8 | 3.3 | 1.8 | 1.9 |
| butylglycol | 2.1 | 2.7 | 3.6 | 4.2 | 2.3 | 2.4 |
| N,N-dimethylethanolamine (10 wt.-% solution in water) | 0.5 | 0.7 | 0.9 | 1.0 | 0.6 | 0.6 |
| deionized water | 1.2 | 1.5 | 2.0 | 2.3 | 1.3 | 1.4 |
| 2,4,7,9-tetramethyl-5-decin-4,7-diol (52 wt.-% in butylglycol) (defoamer and wetting agent) | 0.3 | 0.4 | 0.5 | 0.5 | 0.3 | 0.3 |
| hydroxyfunctional polyurethane modified polyacrylate (DE4437535A1; p. 7, I. 55 - p. 8, I. 23) | 1.0 | 1.3 | 1.7 | 2.0 | 1.1 | 1.2 |
| deionized water | 9.9 | 12.9 | 0.0 | 0.0 | 10.9 | 11.5 |
| N,N-dimethylethanolamine (10 wt.-% solution in water) | 1.4 | 0.6 | 0.8 | 0.9 | 1.5 | 1.6 |
| acrylic copolymer emulsion rheology control agent (10 wt.-% solution of Rheovis ® AS 1130 30 wt.-% from BASF SE) | 30.8 | 16.5 | 13.8 | 0.0 | 23.9 | 19.9 |
| carbon black paste (see Example A) | 7.7 | 10.1 | 13.2 | 15.3 | 8.5 | 8.9 |
| Triisobutylphosphate (defoamer) | 1.2 | 1.5 | 2.0 | 2.3 | 1.3 | 1.4 |

TABLE 2A-continued

| Components | Coating Compositions/amounts in parts-by-weight | | | | | |
|---|---|---|---|---|---|---|
| | BC-C3 | BC-C4 | BC-C5 | BC-C6 | BC-I3 | BC-I4 |
| N,N-dimethylethanolamine (10 wt.-% solution in water) | 0.9 | 0.6 | 0.8 | 0.9 | 1.0 | 1.1 |
| deionized water | 11.8 | 15.4 | 14.0 | 16.3 | 13.0 | 13.7 |
| butylglycol | 4.5 | 5.8 | 7.6 | 8.8 | 4.9 | 5.2 |
| polyether-modified polysiloxane | 1.1 | 1.4 | 1.9 | 2.2 | 1.2 | 1.3 |
| deionized water | 3.5 | 0.0 | 0.0 | 0.0 | 3.8 | 4.0 |
| N,N-dimethylethanolamine (10 wt.-% solution in water) | 0.5 | 0.0 | 0.0 | 0.0 | 0.5 | 0.5 |
| Sum | 100.0 | 100.0 | 100.0 | 100.0 | 100.0 | 100.0 |

TABLE 2B

| Properties of the Coating Compositions | Coating Compositions | | | | | |
|---|---|---|---|---|---|---|
| | BC-C3 | BC-C4 | BC-C5 | BC-C6 | BC-I3 | BC-I4 |
| solids content in % | 6.0 | 10.6 | 11.5 | 13.5 | 8.2 | 9.2 |
| volatile organic content in g/L | 115.9 | 147.3 | 192.2 | 221.7 | 126.8 | 133.0 |
| wt.-% rheology control agent (D) based on total solids | 11.5 | 6.2 | 5.2 | 0.0 | 8.9 | 7.5 |
| wt.-% polymeric surface-active agent (C) based on total solids | 15.6 | 11.6 | 14.0 | 13.8 | 12.6 | 11.8 |
| pH value | 8.4 | 8.5 | 8.4 | 8.6 | 8.4 | 8.4 |
| viscosity in mPas    at 1000 s$^{-1}$ | 62 | 59 | 62 | 63 | 58 | 60 |
| at 0.1 s$^{-1}$ | 21844 | 3008 | 697 | 536 | 8064 | 4512 |

| Properties of the cured Coating from | BC-C3 | BC-C4 | BC-C5 | BC-C6 | BC-I3 | BC-I4 |
|---|---|---|---|---|---|---|
| Bubbling/popping | ok | (ok) | nok | na | ok | ok |
| Bubbling/popping abutting edge | ok | * | ** | na | ok | ok |
| Abutting edge μ-surf | 5 | 3 | 3 | na | 1 | 1 | ok: okay
(ok): okay with limitations
nok: not okay
na: not applicable (nozzles clogged)
* first bubbles at abutting edge
** severe bubbles at abutting edge
Abutting edge μ-Surf: 1 = very good, 2 = good, 3 = acceptable, 4 = bad, 5 = very bad As shown in Table 2B only the substrates coated with the inventive basecoats showed an excellent appearance and levelling in the brush. The substrates coated with the comparative basecoat compositions having a rheology control agent content above (BC-C3) and below (BC-C4 and BC-C5) the claimed range do not provide satisfying results. Basecoat composition BC-C6, which does not contain any rheology control agent was not even applicable. All inventive examples showed a sharp-edged pattern and no overspray was produced.

TABLE 3A

| Components | Coating Compositions/ amounts in parts-by-weight | | |
|---|---|---|---|
| | BC-C7 | BC-I5 | BC-I6 |
| deionized water | 11.9 | 11.7 | 11.7 |
| 2,4,7,9-tetramethyl-5-decin-4,7-diol (52 wt.-% in butylglycol) (defoamer and wetting agent) | 0.3 | 0.3 | 0.3 |
| polyurethane (WO2018/011311; pp. 75-76, Example PD1) | 8.3 | 8.2 | 8.1 |
| butylglycol | 1.7 | 1.7 | 1.7 |
| hydroxyfunctional polyester (DE-A-4009858, Example D, col. 16, ll. 37-59) | 1.7 | 1.7 | 1.7 |
| melamine formaldehyde resin (Cymel ® 203 from Allnex) | 1.8 | 1.8 | 1.7 |
| N,N-dimethylethanolamine (10 wt.-% solution in water) | 0.6 | 0.6 | 0.6 |
| deionized water | 1.3 | 1.2 | 1.2 |
| 2,4,7,9-tetramethyl-5-decin-4,7-diol (52 wt.-% in butylglycol) (defoamer and wetting agent) | 0.3 | 0.3 | 0.3 |

TABLE 3A-continued

| Components | Coating Compositions/ amounts in parts-by-weight | | |
|---|---|---|---|
| | BC-C7 | BC-I5 | BC-I6 |
| hydroxyfunctional polyurethane modified polyacrylate (DE4437535A1; p. 7, I. 55-p. 8, I. 23) | 1.1 | 1.1 | 1.1 |
| deionized water | 11.0 | 10.9 | 10.8 |
| N,N-dimethylethanolamine (10 wt.-% solution in water) | 1.5 | 1.4 | 1.4 |
| Butylglycol | 1.6 | 1.5 | 1.5 |
| acrylic copolymer emulsion rheology control agent (10 wt. % solution of Rheovis ® AS 1130 30 wt.-% from BASF SE) | 24.2 | 23.9 | 23.8 |
| carbon black paste (see Example A) | 8.6 | 8.5 | 8.4 |
| Triisobutylphosphate (defoamer) | 1.6 | 1.5 | 1.5 |
| N,N-dimethylethanolamine (10 wt.-% solution in water) | 1.0 | 1.0 | 1.0 |
| deionized water | 13.5 | 13.3 | 13.3 |
| polyether-modified polysiloxane | 0.0 | 1.2 | 1.7 |
| deionized water | 3.9 | 3.8 | 3.8 |
| Butylglycol | 3.9 | 3.8 | 3.8 |
| N,N-dimethylethanolamine (10 wt.-% solution in water) | 0.6 | 0.6 | 0.6 |
| Sum | 100.0 | 100.0 | 100.0 |

TABLE 3B

| Properties of the Coating Compositions | Coating Compositions | | |
|---|---|---|---|
| | BC-C7 | BC-I5 | BC-I6 |
| solids content in % | 9.9 | 9.8 | 9.7 |
| volatile organic content in g/L | 139.5 | 142.2 | 146.7 |
| wt.-% rheology control agent (D) based on total solids | 7.3 | 7.4 | 7.3 |
| wt.-% polymeric surface-active agent (C) based on total solids | 0.0 | 12.1 | 17.5 |
| Surface tension mN/m | 29.2 | 26.0 | 25.5 |
| viscosity in mPas          at 0.1 s$^{-1}$ | 4697 | 4688 | 4623 |
| Properties of the cured Coating from | BC-C7 | BC-I5 | BC-I6 |
| Levelling in the brush | nok | ok | ok. |
| Abutting edge μ-surf | 5 | 1 | 1 | nok not okay
ok okay
Abutting edge μ-surf: 1 = very good, 2 = good, 3 = acceptable, 4 = bad, 5 = very bad As shown in Table 3B only the substrates coated with the inventive basecoats (BC-15 and BC-16) showed an excellent levelling in the brush and rating 1 in abutting edge. The substrates coated with the comparative basecoat composi-tions having a content of the polymeric surface-active agent below the claimed range do not provide satisfying results of the levelling in the brush and abutting edge. All inventive examples showed a sharp-edged pattern and no overspray was produced.

Preparation of an Effect Pigment Containing Aqueous Basecoat Composition (Comparative)

Preparation of an Aluminum Effect Pigment Slurry (Example B)

3.8 parts by weight of butyl glycol, 8 parts by weight of JetFluid WB21001 (aluminum effect pigment preparation, 25 wt.-% in glycols, median particle size D$_{50}$ (determined by laser diffraction)=2 μm)), 1 part by weight of a hydroxy-functional polyester (DE-A-4009858, Example D, col. 16, II. 37-59) and 0.5 parts by weight of dimethylethanolamine (10 wt.-% in water) were mixed to form a slurry.
Preparation of the Comparative Basecoat Composition BC-C8

In the order to prepare comparative basecoat composition BC-C8 the ingredients as shown table 4 were mixed to form an aluminum effect pigment comprising aqueous basecoat composition. After stirring for 10 min, de-ionized water and N,N-diethyl ethanolamine were added to obtain a pH value of 8.5 and a viscosity at 23° C. of 91 mPas at a shear rate of 1000 s$^{-1}$ (determined as described above).

TABLE 4

| Components | Coating Composition BC-C8/amounts in parts-by-weight |
|---|---|
| deionized water | 11.8 |
| 2,4,7,9-tetramethyl-5-decin-4,7-diol (52 wt.-% in butylglycol) (defoamer and wetting agent) | 0.4 |
| polyurethane (WO2018/011311; pp. 75-76, Example PD1) | 8.2 |
| butylglycol | 1.7 |
| hydroxyfunctional polyester (DE-A-4009858, Example D, col. 16, II. 37-59) | 0.7 |
| melamine formaldehyde resin (Cymel ® 203 from Allnex) | 1.8 |

TABLE 4-continued

| Components | Coating Composition BC-C8/amounts in parts-by-weight |
|---|---|
| N,N-dimethylethanolamine (10 wt.-% solution in water) | 0.6 |
| deionized water | 1.3 |
| 2,4,7,9-tetramethyl-5-decin-4,7-diol (52 wt.-% in butylglycol) (defoamer and wetting agent) | 0.3 |
| hydroxyfunctional polyurethane modified polyacrylate (DE4437535A1; p. 7, I. 55-p. 8, I. 23) | 1.1 |
| deionized water | 10.9 |
| N,N-dimethylethanolamine (10 wt.-% solution in water) | 1.5 |
| butylglycol | 1.5 |
| acrylic copolymer emulsion rheology control agent (10 wt. % solution of Rheovis ® AS 1130 30 wt.-% from BASF SE) | 23.9 |
| Triisobutylphosphate (defoamer) | 1.5 |
| N,N-dimethylethanolamine (10 wt.-% solution in water) | 1.0 |
| deionized water | 13.0 |
| polyether-modified polysiloxane | 1.2 |
| deionized water | 3.8 |
| Aluminum Effect Pigment Slurry (Example B) | 13.3 |
| N,N-dimethylethanolamine (10 wt.-% solution in water) | 0.5 |
| Sum | 100.0 |

In analogy to the basecoats prepared according to the formulations shown in tables 1A, 2A and 3A, it was tried to produce a basecoat by using the method according to the invention. However, already a few minutes after starting the application, the nozzles clogged and it was impossible to carry out the coating process with basecoat BC-C8 comprising platelet-shaped particles having a median particle size $D_{50}$ of 2 μm or above.

The invention claimed is:

1. An aqueous, one-pack coating composition comprising
    (A) at least one polymer selected from the group consisting of self-crosslinkable polymers and externally crosslinkable polymers;
    (B) at least one crosslinking agent for crosslinking the at least one polymer (A), if the (A) at least one polymer is an externally crosslinkable polymer;
    (C) at least one polymeric surface-active agent, and
    (D) at least one organic rheology control agent selected from the group consisting of (meth) acrylic acid-(meth) acrylate copolymer rheology control agents (Reil) and polyurethane rheology control agents (D2),
    characterized in that
    i. the total solids content of the coating composition is from 7.5 wt.-% to 11.5 wt.-%,
    ii. the viscosity at 23° C. is from 2000 mPas to 12000 mPas at a shear rate of 0.1 s⁻¹,
    iii. the amount of (C) is from 0.5 wt % to 25 wt.-% based on the total solids content of the coating composition;
    iv. the amount of (D) is from 5 to 12 wt.-% based on the total solids content of the coating composition; and
    v. the coating composition does not contain platelet-shaped particulate material having a median particle size $D_{50}$ of 2 μm or more.

2. The aqueous, one-pack coating composition according to claim 1, characterized in that the (A) at least one polymer is an externally crosslinkable hydroxyfunctional polymer selected from the group consisting of polyurethanes, polyesters, poly (meth) acrylates and copolymers of said polymers.

3. The aqueous, one-pack coating composition according to claim 1, characterized in that the (B) at least one crosslinking agent for crosslinking the at least one polymer (A) is selected from the group consisting of blocked polyisocyanates and aminoplast resins.

4. The aqueous, one-pack coating composition according to claim 1, characterized in that the (C) polymeric surface-active agent is a levelling agent selected from the group consisting of (meth) acrylic copolymers and polysiloxanes.

5. The aqueous, one-pack coating composition according to claim 1, characterized in that the (D) at least one organic rheology control agent is a (meth) acrylic acid-(meth) acrylate copolymer rheology control agent.

6. The aqueous, one-pack coating composition according to claim 1, further comprising at least one component (E) selected from the group consisting of coatings additives, organic solvents, pigments, fillers and dyes.

7. The aqueous, one-pack coating composition according to claim 6, characterized in that at least one coatings additive is a defoamer.

8. The aqueous, one-pack coating composition according to claim 7, wherein the defoamer is a phosphorous-containing defoamer.

9. The aqueous, one-pack coating composition according to claim 6, wherein the component (E) is an organic solvent having a volatile organic content in the range from 100 to 200 g/L based on 1 L of the coating composition.

10. A method for producing a coating, the method at least comprising the following steps:
    a. emitting a jet of the aqueous, one-pack coating composition according to claim 1 from an application device, wherein, after emerging from the application device, the coating composition jet has a continuous region in the jet direction until said jet reaches a disintegration distance, whereupon, after the disintegration distance, the coating composition jet then dis-integrates into droplets that are separate from one another in the jet direction; and b. positioning the application device at a specified appli-cation distance from the substrate which is to be coated so that the coating composition jet impacts on the substrate and coats the substrate to obtain a coating layer; wherein the application distance is smaller than the disintegration distance of the coating composition jet, so that the coating composition jet impacts on the substrate with the continuous region; or alternatively wherein the application distance is larger than the disintegration distance of the coating composition jet, so that the separate droplets formed impact on the substrate.

11. A method for producing a multi-layer coating, the method comprising the following steps 1) Optionally applying an electrodeposition coating com-position to an optionally conversion-coated metallic substrate and curing the electrodeposition coating to obtain an electrodeposition coating layer; subsequently 2) Optionally applying at least one filler coating compo-sition and/or primer coating composition onto the pre-ceding coating layer or on a substrate to obtain one or more filler coating layer(s) and/or primer coating lay-ers; subsequently 3) Optionally applying at least one basecoat composition and/or at least one clearcoat composition onto the preceding coating layer or on a substrate to obtain at least one basecoat layer and/or at least one clear coat layer; subsequently 4) Applying at least one aqueous, one-pack coating com-position by the method according to claim 10 onto at least part of the preceding layer or on a substrate to obtain a coating layer; and subsequently 5) Applying at least one clearcoat composition onto the coating layer(s) obtained in the preceding step; and 6) Jointly curing all layers that were not cured in any of the preceding steps;

whereby step 4) and at least one of steps 1), 2), 3) and 5) are carried out.

12. The method according to claim 11, characterized in that all of steps 1) to 6) are carried out.

13. The method according to claim 11, characterized in that steps 3), 4), 5) and 6), are carried out, and that in step 3) a clearcoat composition is applied on a plastic substrate, which is optionally precoated according to step 2) and/or precoated with a basecoat according to step 3).

14. The method according to claim 13, characterized in that the plastic substrate comprises at least one component selected from the group consisting of polypropylene (PP), polyethylene (PE), acrylonitrile butadiene styrene (ABS) and ethylene propylene diene monomer rubber (EPDM).

15. A coated substrate, obtainable by the method of claim 10.

16. The method of claim 11, wherein step 2) further comprises at least partially curing the filler coating layer(s) and/or primer coating layers.

17. The method of claim 11, wherein step 3) further comprises drying and/or at least partially curing the basecoat layer(s) and/or clearcoat layer(s).

18. The method of claim 11, wherein step 5) further comprises drying and/or at least partially curing the obtained coating layer(s).

19. A method for producing a multi-layer coating, the method comprising the following steps 1) Optionally applying an electrodeposition coating com-position to an optionally conversion-coated metallic substrate and curing the electrodeposition coating to obtain an electrodeposition coating layer; subsequently 2) Optionally applying at least one filler coating compo-sition and/or primer coating composition onto the pre-ceding coating layer or on a substrate to obtain one or more filler coating layer(s) and/or primer coating lay-ers; subsequently 3) Optionally applying at least one basecoat composition and/or at least one clearcoat composition onto the preceding coating layer or on a substrate to obtain at least one basecoat layer and/or at least one clear coat layer; subsequently 4) applying at least one aqueous, one-pack coating com-position according to claim 1 onto at least part of the preceding layer or on a substrate to obtain a coating layer; and subsequently 5) Applying at least one clearcoat composition onto the coating layer(s) obtained in the preceding step; and 6) jointly curing all layers that were not cured in any of the preceding steps;

whereby step 4) and at least one of steps 1), 2), 3) and 5) are carried out.

20. The aqueous, one-pack coating composition accord-ing to claim 1, wherein the amount of (C) is from 4 wt % to 25 wt.-% based on the total solids content of the coating composition.

* * * * *